March 31, 1959  J. M. MUSGRAVE  2,879,944
ILLUMINATED FOUNTAIN DISPLAY

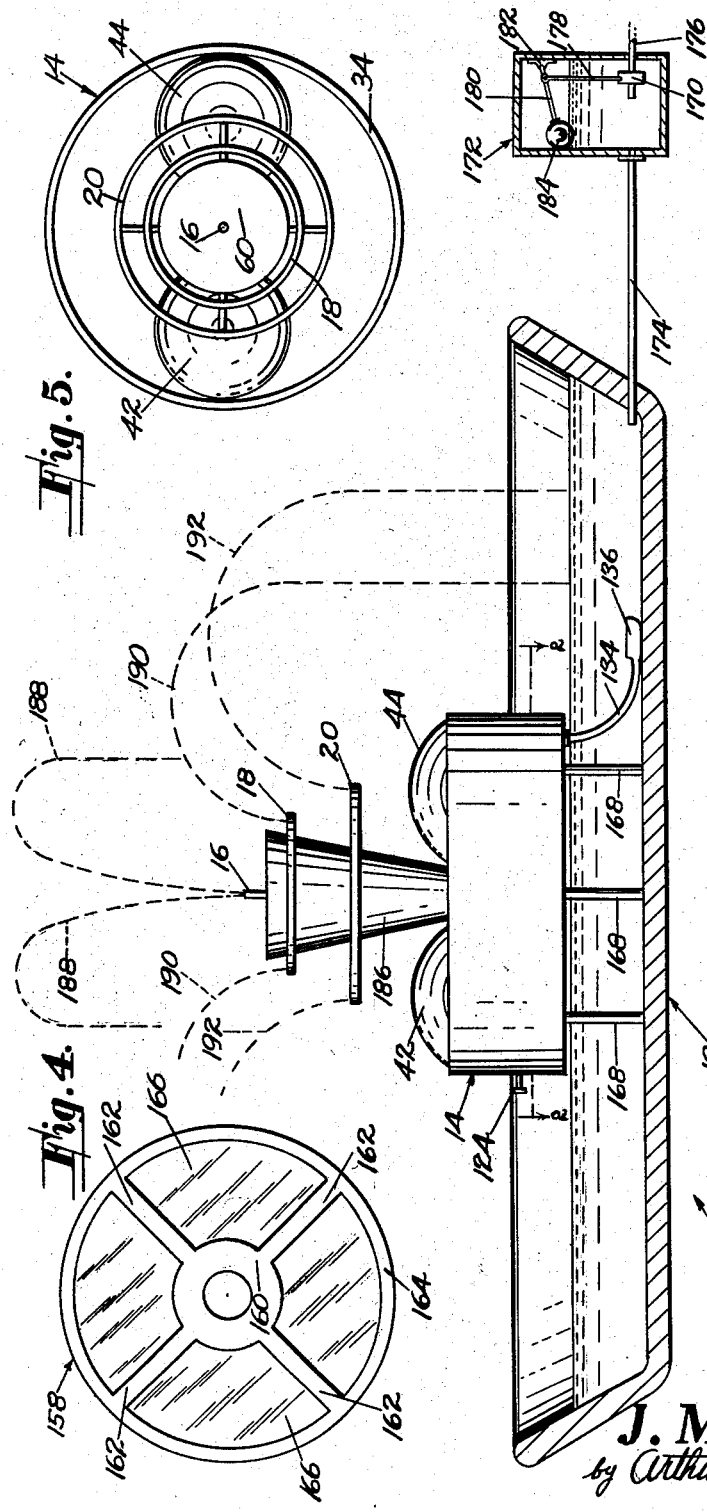

Filed July 2, 1956  2 Sheets-Sheet 2

INVENTOR.
J. M. Musgrave
by Arthur H. Sturges, Attorney

United States Patent Office 2,879,944
Patented Mar. 31, 1959

2,879,944

ILLUMINATED FOUNTAIN DISPLAY

John M. Musgrave, Woodbine, Iowa

Application July 2, 1956, Serial No. 595,231

3 Claims. (Cl. 239—20)

This invention relates to water fountains of the type used in public parks wherein lights are played on sprays of water and in which the water is recirculated, and in particular a basin pool having a plurality of spray devices extended upwardly therefrom with lights of different colors projected on sprays of water and with means for continuously changing the heights of the sprays, and also means for maintaining the water at a constant level in the pool.

The purpose of this invention is to provide an inexpensive water fountain having lights played on changing sprays so that small communities may have the advantage of attractive water displays.

Continuously operating water fountains require large quantities of water and in numerous communities, and particularly when the rainfall is at a minimum, it is not considered practical to use water in continuously operating water fountains. With this thought in mind this invention contemplates a fountain assembly wherein the water is reused and wherein the operating instrumentalities are enclosed in a relatively small housing positioned in the fountain.

The object of this invention is, therefore, to provide an operating unit for a fountain for public parks and the like wherein the complete assembly of the fountain may be manufactured and distributed as a unit.

Another object of the invention is to provide a fountain assembly for water fountains for use in public parks and the like in which the fountain may readily be installed by the average workman.

Another important object of the invention is to provide an operating unit for water fountains for use in public parks and the like wherein the height of sprays of the fountain is changed continuously.

It is yet another object of the invention to provide an assembly for a water fountain for public or private use in which means is provided for independently regulating the volume of water supplied to each of the sprays thereof.

A further object of the invention is to provide a water fountain assembly particularly adapted for installing fountains in private and public parks in which means is provided for playing lights of different colors upon sprays of the fountain.

A still further object of the invention is to provide a complete water fountain unit for use in installing fountains in parks and the like in which the unit is of a simple and economical construction.

With these and other objects and advantages in view the invention embodies an open basin, a housing carried by posts and positioned in the basin, spray devices extended upwardly from the housing, means for continuously changing the pressure of water supplied to the spray devices to vary the height of the sprays, means for lighting the sprays, means for recirculating water of the sprays, and means for maintaining water at a constant level in the basin.

Other features and advantages of the invention will appear from the following description taken in connection with the drawings, wherein:

Figure 1 is an elevational view of a water fountain assembly with part shown in section, showing the assembly positioned in a basin pool and showing the paths of water sprayed by the assembly in broken lines.

Figure 4 is a plan view of one of the color discs through which rays of light are projected upon the sprays of water.

Figure 5 is a plan view of the operating unit.

Figure 3:
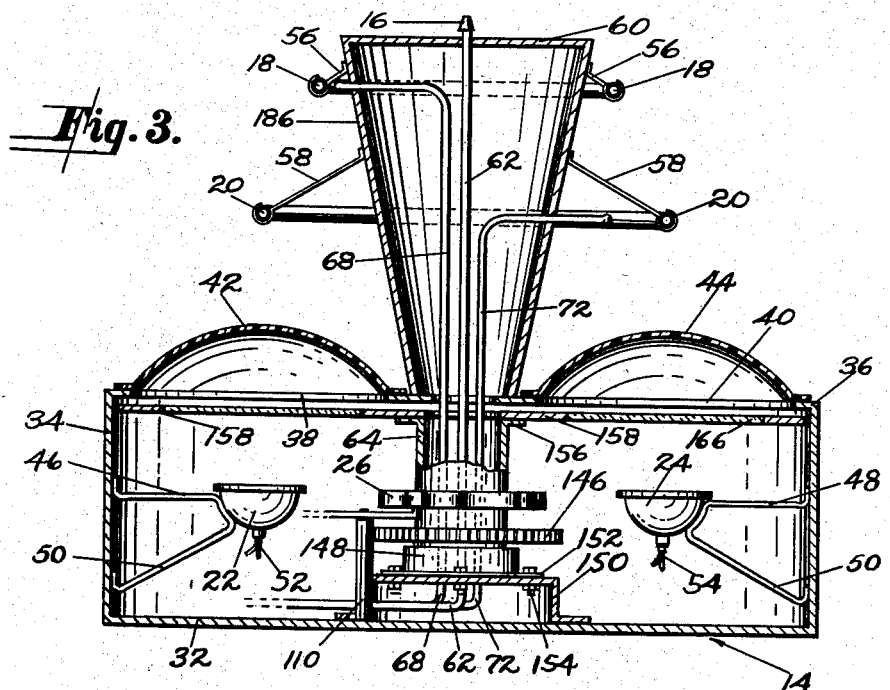
Figure 3 is a cross section through the fountain assembly taken on line 3—3 of Figure 2, with the upper portion of the housing, spray assembly, and lights added.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating an enlarged basin for receiving water from the fountain, numeral 14 a housing in which the operating instrumentalities are positioned, numeral 16 a vertically disposed spray nozzle, numerals 18 and 20 spray rings extended around and positioned below the nozzle, numerals 22 and 24 lights positioned in the housing, numeral 26 a cam for actuating the spray controls, and numeral 28 a motor for operating the cam and a circulating pump 30.

The housing 14 is provided with a base 32, with a cylindrical wall 34 extended upwardly from the periphery, and a cover 36 in which openings 38 and 40 are provided. Transparent dome-shaped covers 42 and 44 are positioned over the openings and the lights 22 and 24 are positioned below and aligned with the centers of the openings and covers. The lights, which are suspended from the wall 34 by brackets including arms 46 and 48 and braces 50, are supplied with electric current through wires 52 and 54.

Figure 2:
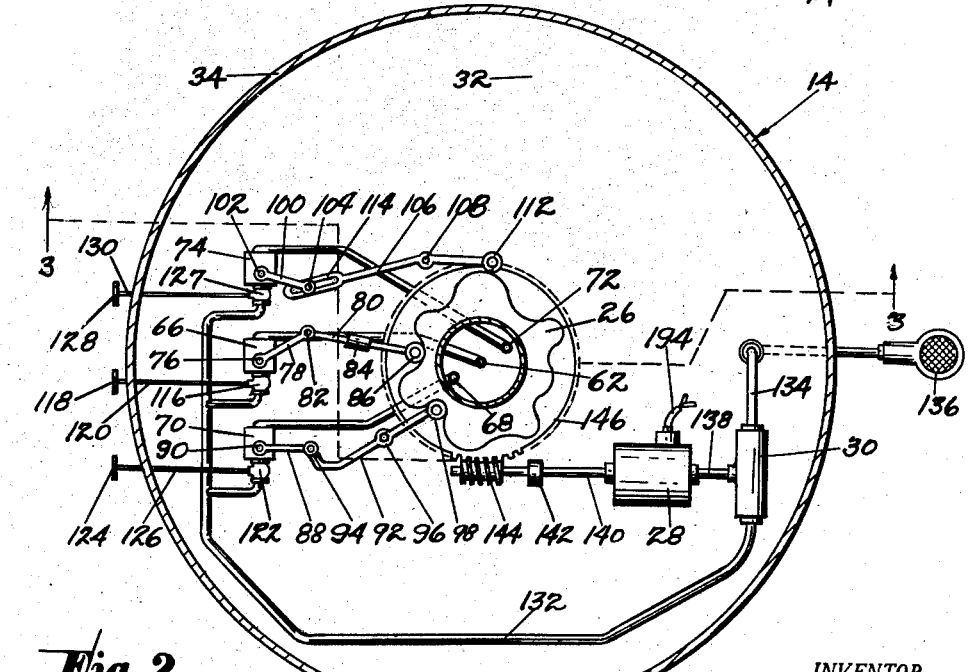
Figure 2 is a sectional plan through the fountain assembly taken on line 2—2 of Figure 1 with the parts shown on an enlarged scale.

The spray devices are supported by an inverted frusto-conical-shaped post 186, which may be a statue or other design, and the post, which is mounted on the cover 36, is provided with brackets 56 and 58 for supporting the spray rings or headers 18 and 20, respectively, and a cover plate 60 in which the nozzle 16 is held. The nozzle 16 is supplied with water through a tube 62 which extends through the cover of the housing and through a rotatable casing 64 on which the cam 26 is mounted, and, as shown in Figure 2, the lower end of the tube extends laterally to a control valve 66. In the same manner the upper spray ring is supplied with water through a tube 68 which extends to a control valve 70, and the lower spray ring 20 is supplied with water through a tube 72 that extends from a control valve 74.

The upper end of the stem 76 of the valve 66 is provided with a link 78 which is pivotally connected to a bar 80 by a pin 82 and the bar, which is slidably mounted in a bearing sleeve 84, is positioned whereby a roller 86 on the inner end thereof travels over lobes of the cam 26 whereby upon rotation of the cam the valve is gradually opened and closed to regulate the pressure and also the amount of water supplied to the spray ring. In the same manner the valve 70 is actuated by a link 88 on a stem 90, the opposite end of the link being pivotally connected to a lever 92 with a pin 94, and the lever being pivotally mounted on a pin 96 whereby a roller 98 on the inner end of the lever is positioned to ride over the lobes of the cam. The valve 74 is also actuated by similar means whereby a link 100 on the stem 102 of the valve is provided with a pin 104 that extends through a slot 114 in a lever 106 which is pivotally mounted by a pin 108 on a bearing stand, such as the stand 110, and which is provided with a roller 112 that is positioned to ride over lobes of the cam.

Each of the control valves is provided with a manually actuated valve for regulating the supply of water to the nozzle and spray rings, and also for shutting off the water supply; the valve 66 having a valve 116 with a handle 118 on a rod 120 extended therefrom, the valve 70 having a valve 122 with a handle 124 on a rod 126 extended therefrom, and the valve 74 having a valve 127 with a handle 128 on a rod 130 extended therefrom. The handles of the valve rods are positioned on the outside of the cylindrical wall 34 to facilitate actuating the valves while the fountain is in operation.

The control valves are supplied with water by a tube 132 which is provided with branch connections to the valves and the tube 132 extends from the discharge of the pump 30. The intake of the pump is connected by a tube 134 to a screened intake head 136 which is positioned in the basin 12.

The pump 30 is connected to the motor 28 by a shaft 138 and a shaft 140, extended from the opposite end and rotatably mounted in the housing with a bearing 142, is provided with a worm 144 that meshes with a worm gear 146 on the casing 64 and on which the cam 26 is also mounted, whereby upon rotation of the motor the cam 26 and casing 64 are rotated. The casing 64 is mounted by a bearing 148 on a stand 150 in the lower part of the housing, the bearing being provided with a flange 152 through which bolts 154 extend. The bolts also extend through the upper surface of the stand.

The upper end of the casing 64 is also provided with a flange 156 upon which the color disc 158 is mounted, and, as shown in Figure 4, the disc 158 is provided with a hub 160 from which arms 162 which are also connected to a rim 164 extend. The openings 166 between the arms 162 are covered with colored transparent material through which rays of light are projected to the sprays. By this means the colors of the sprays are changing continuously.

The housing 14 is supported on spaced legs 168, as shown in Figure 1, wherein the base of the housing is positioned at the water level, and the water is maintained at a constant level with a float actuated valve 170 in a control tank 172 which is connected to the basin 12 with a tube 174. The valve 170, which is connected in a supply pipe 176, is provided with a stem 178 that is connected to an arm 180 which is pivotally mounted in the tank with a bearing 182 and which is provided with a float 184, whereby as the water level drops the float opens the valve 170, and as the float is carried upwardly to the desired level of the water in the basin the valve is closed. The tank 172 may be located at a suitable remote point whereby the water level therein is at the same elevation as that of the water in the basin.

It will be understood that any suitable spray devices may be used and the water may be sprayed in different patterns. In the design shown in Figure 1, water from the nozzle 16 at the upper end of the post 186 is sprayed directly upwardly as indicated by the dotted lines 188, water from the upper ring 18 is sprayed upwardly and outwardly, as indicated by the dotted lines 190, and water from the lower ring 20 is also sprayed upwardly and outwardly, as indicated by the dotted lines 192.

It will also be understood that the color segments of the disc 158 may be of different colors, or all may be of the same color, as may be desired.

The fountain may be connected to a conventional service water line and the motor connected by wires 194 to a light circuit.

Operation

With the device distributed as a complete unit the basin, or an open flat tank or the like may be installed in the ground or within a circular wall, and with the parts connected as described, the motor is started, whereby the pump circulates water from the basin through the pipes or tubes to the nozzle and spray rings. At the same time the lights project colored rays upon the sprays and the colors change continuously.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent is:

1. In a fountain assembly, the combination which comprises an open basin, a sealed housing positioned in the basin and spaced upwardly therefrom, means for supporting the housing from the basin a post extended upwardly from the housing, spray devices carried by the post, tubes extended from the spray devices downwardly into the housing, control valves positioned in the housing and to which the tubes are connected, a tubular casing rotatably mounted in the housing, a cam on the tubular casing having spaced irregular lobes thereon, means for actuating the control valves by the cam, a pump in the housing for circulating water from the basin to the spray devices through the control valves, a disc having colored segments therein carried by the tubular casing, said housing having openings in the upper surface, and lights in the housing for projecting light rays through the segments of the disc and openings upon sprays of the spray devices.

2. In a water fountain assembly, the combination which comprises an open basin, a substantially sealed housing positioned above the basin, means for supporting the housing from the basin said housing having openings in the upper surface and said openings being closed by dome-shaped transparent elements, a tubular casing rotatably mounted in the housing, a disc having colored segments therein carried by the tubular casing and positioned whereby the segments register with the openings of the housing, a post extended upwardly from the housing, a spray nozzle mounted on the upper end of the post, vertically spaced spray rings carried by the post, control valves positioned in the housing, tubes connecting the nozzle and spray rings to the control valves, a cam having irregular lobes thereon carried by the tubular casing, means actuating the control valves by the cam for varying the sprays, means for rotating the tubular casing, cam and disc, lights for projecting rays of light through the segments of the disc and upon sprays of the nozzle and spray rings for adding varying colors to the sprays, a pump for circulating water from the basin through the control valves and tubes to the spray nozzle and rings, means for manually controlling the supply of water to the control valves, and a float assembly for maintaining water in the basin at a constant elevation.

3. In an illuminated fountain, the combination which comprises an open basin having a base with a continuous upwardly extended side wall, a sealed housing in the basin, means for supporting the housing in spaced relation to the base of the basin, a post mounted on the upper surface of the housing and extended upwardly therefrom, vertically spaced spray headers around and supported by the post, water supply tubes extended from the spray headers downwardly through the post and into the housing, a water pump in the housing positioned with the suction side thereof connected to an intake below the water level in the basin and with the discharge thereof connected independently to the tubes from the spray headers, valves in the connections to the spray headers, a multiple lobe cam mounted in the housing, means actuated by the lobes of the cam for opening and closing the valves to vary the spray of the spray headers, circumferentially spaced transparent dome-shaped elements mounted in the upper surface of the housing, and lights in the housing below the dome-shaped elements for projecting rays of light upon the sprays, the pump and cam being actuated by suitable means.

References Cited in the file of this patent

UNITED STATES PATENTS

| | | |
|---|---|---|
| 557,263 | Gilmore et al. | Mar. 31, 1896 |
| 1,837,732 | Stabler | Dec. 22, 1931 |
| 1,885,830 | Hutchings | Nov. 1, 1932 |
| 2,572,379 | Pearse | Oct. 23, 1951 |
| 2,664,311 | Cunningham | Dec. 29, 1953 |
| 2,745,697 | Pearse | May 15, 1956 |